United States Patent
Zimniewicz et al.

(12) United States Patent (10) Patent No.: US 6,473,771 B1
(45) Date of Patent: Oct. 29, 2002

(54) METHOD OF INTEGRATING APPLICATION PROGRAMS TO FORM OR MODIFY SUITE, AND A SUITE INTEGRATION TOOLKIT TO PERFORM SAME

(75) Inventors: Jeff A. Zimniewicz, Bellevue; Crista Johnson, Seattle, both of WA (US); Phillip J. Marino, Dublin, OH (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/536,484

(22) Filed: Mar. 27, 2000

(51) Int. Cl.[7] .............................................. G06F 17/30
(52) U.S. Cl. ........................ 707/104; 709/229; 717/11; 395/712
(58) Field of Search ........................... 709/229; 717/11; 395/212; 701/104

(56) References Cited

U.S. PATENT DOCUMENTS

| | | | | |
|---|---|---|---|---|
| 5,950,010 A | * | 9/1999 | Hesse et al. ................. | 395/712 |
| 5,960,204 A | * | 9/1999 | Yinger et al. ................ | 395/712 |
| 5,966,540 A | | 10/1999 | Lister et al. ................. | 395/712 |
| 6,134,593 A | * | 10/2000 | Alexander et al. ........... | 709/229 |
| 6,279,154 B1 | | 8/2001 | Davis ........................... | 711/11 |
| 6,282,711 B1 | * | 8/2001 | Halpern et al. ............... | 717/11 |
| 6,327,705 B1 | * | 12/2001 | Larsson et al. ............... | 717/11 |
| 6,381,644 B2 | * | 4/2002 | Munguia et al. ............. | 709/225 |
| 2002/0066010 A1 | * | 5/2002 | Dunphy-Bourke .......... | 713/100 |

OTHER PUBLICATIONS

U.S. patent application No. 09/567,732, filed May 10, 2000.*
U.S. patent application No. 09/557,143, filed Apr. 25, 2000.*
U.S. patent application No. 09/565,927, filed May 5, 2000.*
Plumley, "Documented Backoffice", John Wiley & Sons, Inc. 1998.*
*Smart Update Developer's Guide*, "Chapter 4 Writing an Installation Script", available at http://developer.netscape.com/docs/manuals/communicator/jarman/install.htm, accessedJan.15, 2001.*

* cited by examiner

*Primary Examiner*—Charles L. Rones
(74) *Attorney, Agent, or Firm*—Leydig, Voit & Mayer, LTD (57) ABSTRACT

Presented is a system and method for creating, extending, or otherwise modifying an application program suite. Specifically, by writing setup database files for each individual application to be included in a suite in accordance with the data structure required by the Suite Integration Toolkit (SIT), these applications may be combined to form, or added to, a suite. Components for a suite are listed in several sections of the setup database file. Since this list is not set to any fixed number of components, the list can be changed at any time before setup.exe is run. Once setup.exe is run, the file is parsed for the information in the relevant sections. The data in these fields is used without any understanding of the specifics of the suite, which allows the SIT engine/technology to be ignorant of the specifics of the suite. As a result, the suite owner/writer is afforded the maximum flexibility in creating or modifying a suite of applications. In addition to integrating the applications into a suite thereby allowing a single seamless install/setup, the SIT engine of the instant invention also provides proper dependency checking and error recovery. During the installation of the suite, the SIT engine determines the superset of information needed by each application for acquisition from the user. If a single application requires different information for a particular field than that required by the other programs, a separate entry for that particular program will be generated and will supply that information only to that particular program.

18 Claims, 9 Drawing Sheets

METHOD OF INTEGRATING APPLICATION PROGRAMS TO FORM OR MODIFY SUITE, AND A SUITE INTEGRATION TOOLKIT TO PERFORM SAME

TECHNICAL FIELD

This invention relates generally to the integration of disparate application programs into a suite, and more particularly to the formation and modification of program suites such that setup of the constituent programs is seamless from a user's perspective.

BACKGROUND OF THE INVENTION

The concept of an application program suite has become quite common in recent years and their popularity and desirability among the consuming public continues to rise. These program suites are popular, in part, due to the synergy that is produced when disparate programs of like productivity or functionality are packaged together. Examples of such program suites include Microsoft's BackOffice (a collection of all of the server applications available from Microsoft) and Microsoft's Visual Studio (a collection of all of the development tools available from Microsoft), to name just two. The concept of a suite has become so popular that many programs, such as Microsoft's Exchange 2000 Server are becoming "partial suites." That is to say, they are now including other applications within their application to help increase productivity and extend the capability of the core application.

While application program suites provide expanded capabilities, these particular capabilities, and therefore the choice of which application programs to include in the suite, are chosen typically by the primary software OEM (original equipment manufacturer). As such, any particular suite may provide too much, too little, or simply the wrong mix of actual functionality needed by any particular user. This situation may arise where: (a) a particular user does not need the functionality provided by one of the applications included in the suite; (b) the user needs the functionality provided by all of the applications in the suite and that provided by another application not included in the suite; or (c) the user needs the functionality provided by one of the programs in the suite, but wants that functionality provided by a different application. While a user has the ability with many suites to deselect certain programs so that they are not installed and may purchase additional applications, these solutions are not ideal.

Additionally, many computer manufacturers include proprietary software applications and application program suites with the sale of their computers. Likewise, some third party value added providers (VAP) provide a bundling of various software applications, forming a suite-like grouping of like functioned applications. Many of these manufacturers and VAPs would prefer to be able to integrate their proprietary or selected software into an application program suite to allow the proprietary software to take advantage of the single program setup normally associated with an application program suite. Unfortunately, there currently exists no easy way to form, supplement, or otherwise modify an application program suite such that a single integrated setup of all of the disparate programs included therein can be performed.

Even for the software OEMs, the integration of disparate application programs into a suite is no simple task. The coordination of various program dependencies, necessary components, version checking, etc. required by each of the applications takes significant resources in the suite integration process. Further, since the disparate applications to be combined may have been developed by different teams or vendors at different times, they often use different installation, setup, and user interface (UI) technologies. For example, one program may utilize a setup wizard, another may use a dialog-based setup, another may use a web-based setup UI, etc. To integrate these programs into a suite such that the end user interface is seamless is a significant task that, once accomplished, does not lend itself to third party expansion or modification.

Early application program suites that combined disparate application programs utilizing different setup programs simply launched these different setups during the end user install. As a result, the user would have to answer several questions regarding name, organization, product identification (PID), etc. several times, once for each product in the so-called suite. This was little better than the user individually installing each program individually, and resulted in significant overhead be carried both at the application program setup level and at the suite level. This overhead results from the duplication in the various setups of the data collection for each application program, as well as from an intermediate suite setup layer that had to be written for the suite to launch the various setups and to provide a somewhat integrated suite UI for the setup. Further, this solution also presented maintenance problems resulting from the amount of code changes that were required when anything new was added.

As may be appreciated, once this integration process was complete, the ability of a third party to expand the suite by adding its own application program thereto was severely limited. However, third party software VAPs and hardware OEMs wanted a way to do just this. In response to these desires, at least one software OEM improved the flexibility of their suites by adding various unattended and command line methods for running setup. As a result, the computer was setup to launch the third party application setup, and after that setup was complete, to automatically launch the setup of the suite. This resulted in a pseudo-suite in which the end user would be essentially unaware that the third party application was not truly integrated into the application program suite. Another method to satisfy the third party desires was to add a line into the suite setup database file that would launch the setup of the third party application program after the setup of the suite was complete. While these solutions work and present a pseudo-suite to an end user, they do not provide all of the flexibility demanded by the third party software VAPs and hardware OEMs.

There exists, therefore, a need to provide an extensible method of allowing true suite formation, expansion, modification, etc., that provides a strong, seamless, and single end user setup experience.

SUMMARY OF THE INVENTION

The inventive concepts disclosed in this case involve the construction, extension, and modification of a suite of application programs. This allows for a simplified and unified install and setup sequence to completely install all of the programs in the newly constructed or amended suite. In this way, the above-described and other problems have been overcome by the instant invention. Specifically, by writing setup database files for each individual application to be included in a suite in accordance with a data structure of the instant invention for later merging into a single suite setup database file, these applications may be combined to form, or added to, an integrated application program suite.

In accordance with the instant invention, components for a suite are listed in several sections of the setup database file. Since this list is not set to any fixed number of components, the list can be changed at any time before setup.exe is run. Therefore, any number of setup database files may be merged into a single file to form a suite prior to running the setup.exe file. Once setup.exe is run, the file is parsed for the information in the relevant sections. The data in these fields is used without any understanding of the specifics of the suite, which allows the Suite Integration Toolkit (SIT) engine/technology of the instant invention to be ignorant of the specifics of the suite. As a result, the suite owner/writer is afforded the maximum flexibility in creating or modifying a suite of applications.

In addition to integrating the applications into a suite thereby allowing a single seamless install/setup, the SIT engine and method of the instant invention also provides proper dependency checking and error recovery among the various application programs included or bundled into the suite. This function is similar to the debug and release methodology whereby the install will flag the error but then continue with the install, if possible. If a program is needed based on another program's dependency thereon but is not included, the suite install will simply not install that program. With regard to the programs that may be installed, the SIT engine determines the superset of information needed by each application for acquisition from the user. If a single application requires different information for a particular field than that required by the other programs, a separate entry for that particular program will be generated and will supply that information only to that particular program.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 8 a–c are a simplified process flow diagram illustrating the basic flow of a suite setup in accordance with a method of the instant invention;

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
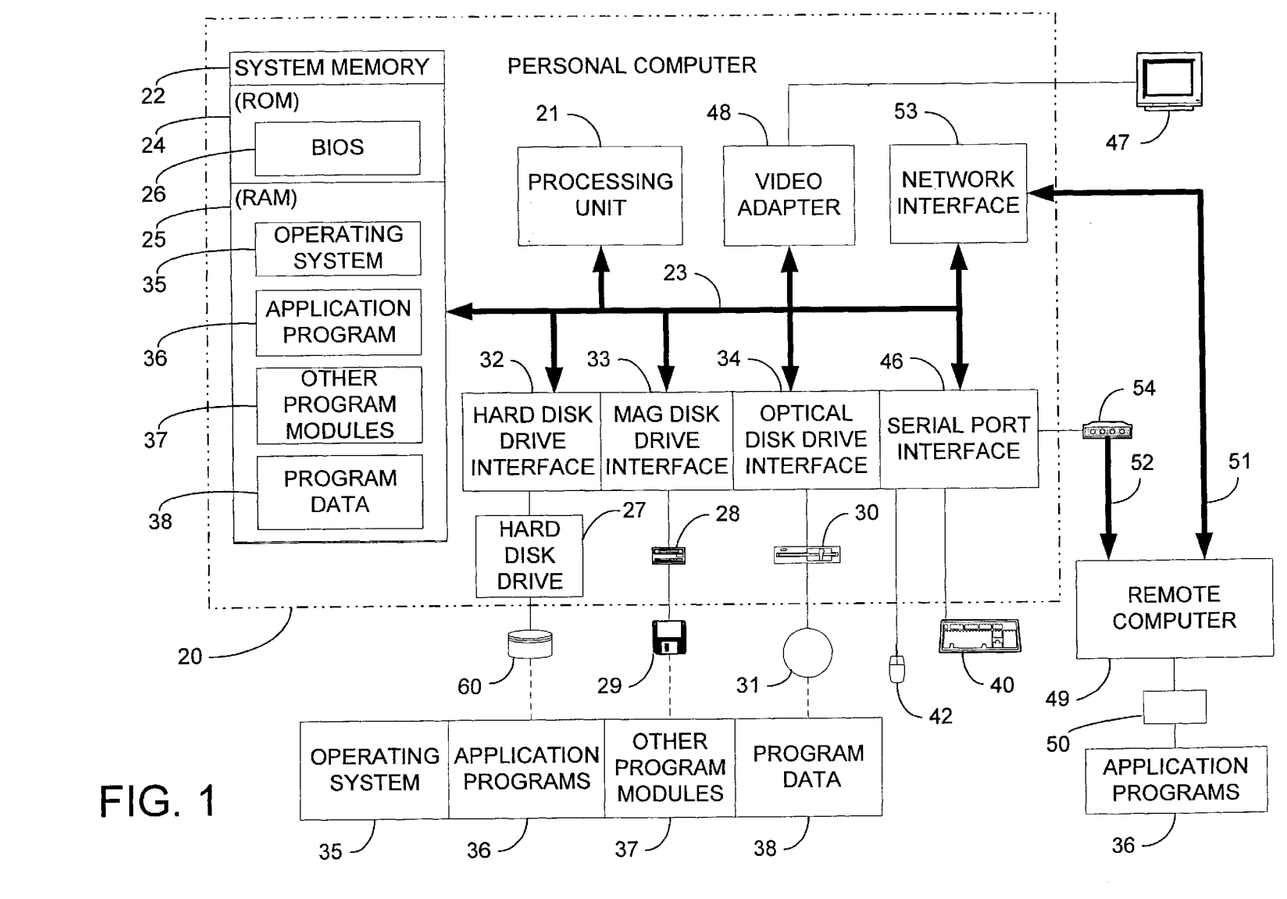
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a system and method are presented that allows the building and third party expansion or bundling of application programs into a new or existing suite. This system is embodied in a Suite Integration Toolkit (SIT) and relies upon a common architecture used for the setup database files (setup.sdb) for each of the application programs to be combined into a new or existing suite. SIT facilitates this bundling by providing a generic solution to the problem of integrating multiple setups (e.g. a box containing OS, IE, MMC, server app, etc.) into a single, concise, unified setup. SIT complements, but does not replace, existing installer technology. SIT works as an integration layer for disparate setups but does not perform core setup tasks such as file copy, registry modifications, etc., although it may be expanded to do so if desired.

In addition to addressing existing integration issues as discussed above, SIT also preferably provides a flexible and extensible COM layer for applications that want to hook into setup. This allows these applications to modify the UI, launch additional processes during the setup, or install components that have previously been downloaded to a central directory on the local machine. Third-parties can ship a product installed via SIT and seamlessly hook their aftermarket application into the integrated setup, without having to modify any of the released product's code. While significant advantages are presented when SIT is COM based, one skilled in the art will recognize that SIT may be programmed using other technology without departing from the scope or spirit of the teachings herein.

Figure 2:
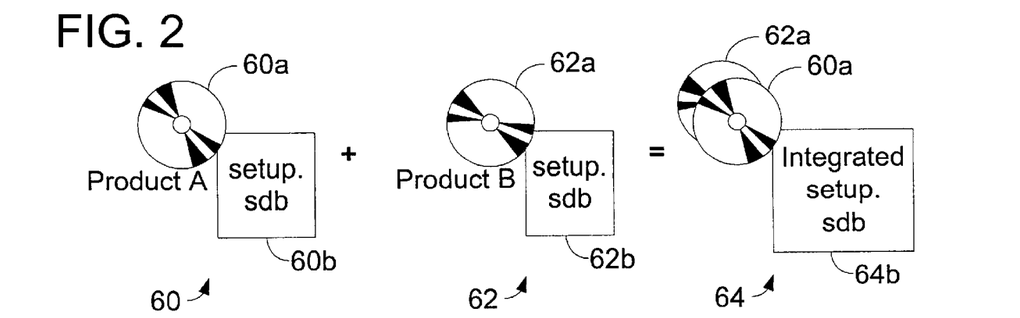
FIG. 2 is a simplified graphical representation of the construction of an application program suite in accordance with the instant invention.

To illustrate one of the problems to which SIT is addressed, attention is now focused on the illustration of FIG. 2. Specifically, FIG. 2 illustrates the bundling of two disparate application products 60, 62 to form an integrated application program suite 64 utilizing the teachings of the instant invention. In accordance with these teachings, each disparate application product 60, 62 to be bundled contains its own application program and data 60a, 62a, and a setup.sdb file 60b, 62b that conforms to a standard format described more fully below. The suite owner, or the party who wants to create the suite, then utilizes the SIT of the instant invention to combine these disparate products 60, 62 into a new application program suite 64. This new suite 64 contains each of the application programs and data 60a, 62a, and a new, integrated setup.sdb file 64b. This integrated setup.sdb file 64b contains the setup information for each of the merged or bundled application products 60, 62, and allows the seamless installation and setup of these disparate products 60, 62 in the new suite environment.

Figure 3:
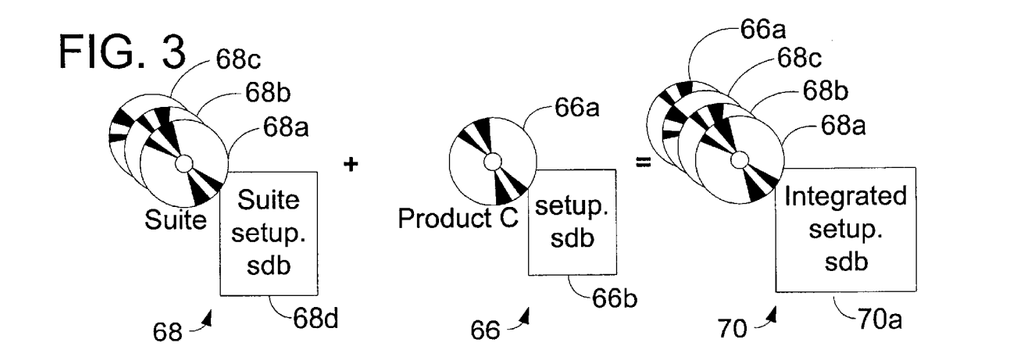
FIG. 3 is a simplified graphical representation of the expansion of an application program suite in accordance with the instant invention.

While FIG. 2 illustrates in a graphically simple way the bundling of disparate software products 60, 62 into a suite 64, FIG. 3 illustrates in this same way the addition of a third party software product 66 to an existing application program suite 68 to form an expanded suite 70. In this example, the existing suite 68 contains the various application programs and associated data 68a–c, and a suite setup.sdb file 68d. This suite setup.sdb file contains the merged setup information for each of the disparate application programs' setup.sdb files. This file 68d may have been written in this merged form, or may have been created by the software OEM in a process similar to that illustrated in FIG. 2, above.

The software product 66 to be added to suite 68 also contains the application program and related data 66a, and a setup.sdb file 66b containing the setup information for that software product 66a in the standardized format of the instant invention. Once the SIT is utilized to extend the suite 68 with the software product 66, a new suite 70 is formed. This new suite 70 contains the individual application programs and data 68a–c of the old suite and the added application program and data 66a. Further, the new suite 70 contains an expanded, integrated setup.sdb file 70a which is made up of the old suite setup.sdb file 68d, expanded with the information from the setup.sdb file 66b.

Figure 4:
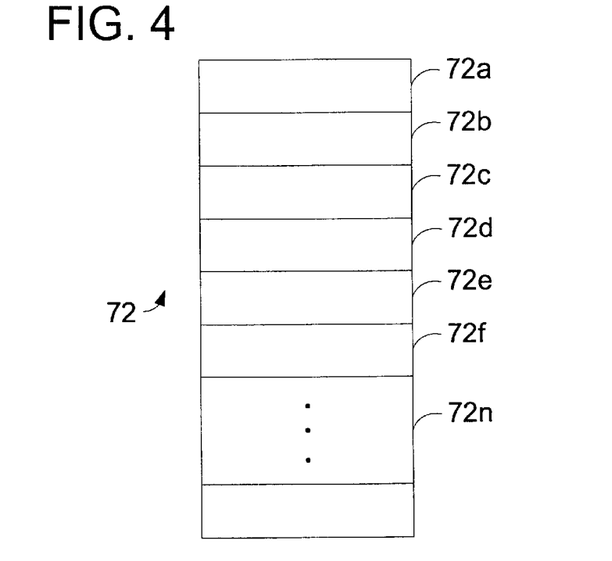
FIG. 4 is a file architectural diagram illustrating a simplified file architecture for a setup database file in accordance with the instant invention.

While the organization and data structure of the setup.sdb file may take any standardized form containing the information required to properly install and setup the applications, a preferred embodiment of this data structure is illustrated in FIG. 4 to which specific reference is now made. The format of this setup database file 72 is preferably .ini or .inf file based. As illustrated, the setup database file 72 is essentially divided into a plurality of known, standardized sections 72a–n into which is included the information for each application program. As will be recognized by one skilled in the art, these sections 72a–n are not physically separated, but are merely segregated by proper section headings. For example, a setup.sdb file 72 in accordance with a preferred file structure includes at least the following sections: complete component list; install order; component display; suite specific text; install actions; custom property overrides; and SIT manager information.

Figure 5:
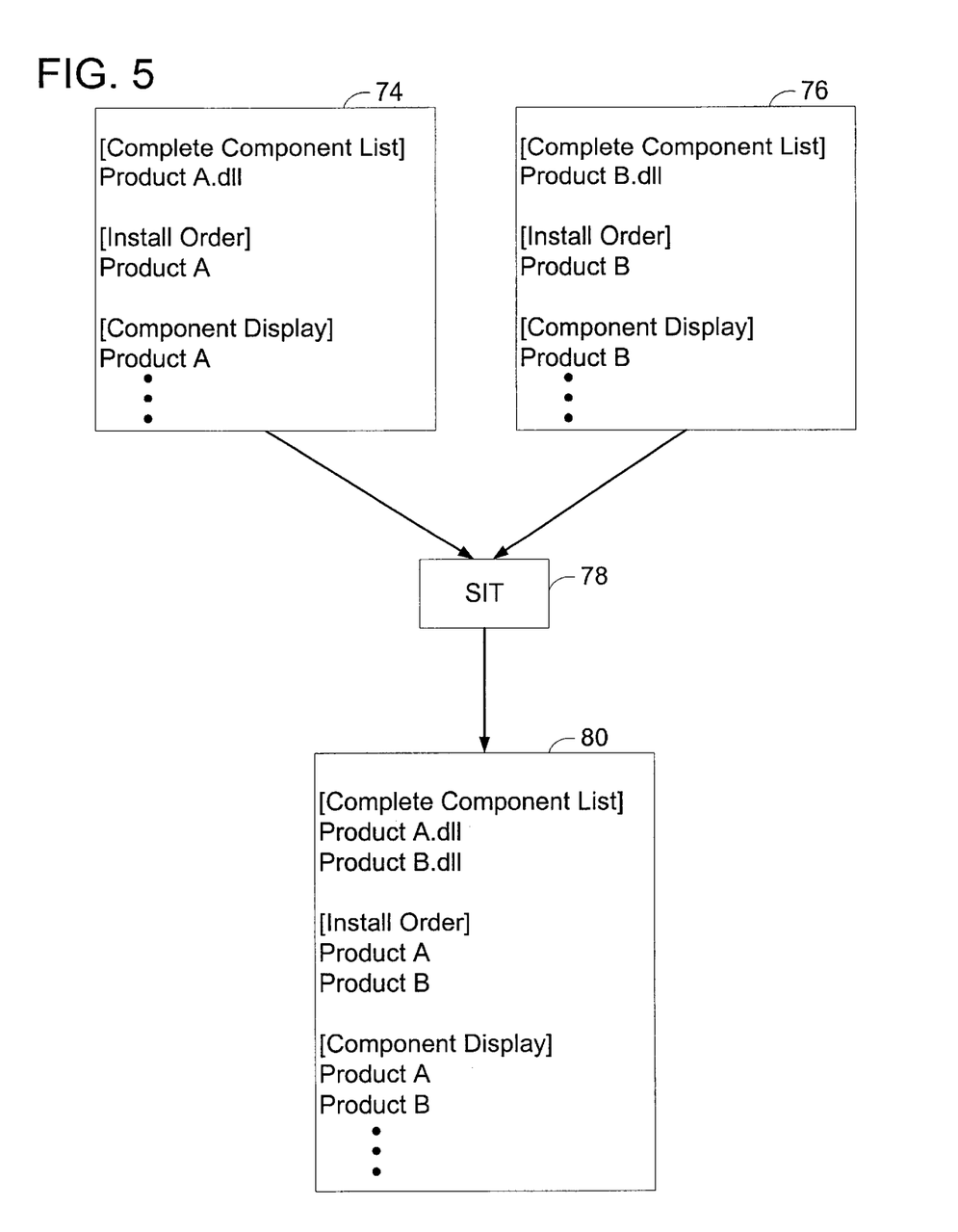
FIG. 5 is a simplified graphical representation of the merging of disparate setup database files to form an integrated suite setup database file in accordance with the teachings of the instant invention.

To gain a better understanding of the merging of the setup database files of disparate application programs to form or otherwise modify a suite setup database file, attention is now directed to FIG. 5. As may be seen, the setup.sdb file 74 for "Product A" is constructed in accordance with the structure of FIG. 4. This file identifies only the ProductA.dll in the [complete component list] section, ProductA in the [install order] section, etc. since it was written only for Product A. Likewise, the setup.sdb file 76 for Product B identifies only ProductB.dll in the [complete component list] section, ProductB in the [install order] section, etc. since it was written only for Product B. The combined or suite setup.sdb file 80 is generated by SIT 78 through a simple text merging process for each of the sections of the files. Of course, this merging process (and later suite content editing) may be accomplished using a text editor, however the SIT automates the process. In addition to a simple text editor, a validation tool may also be used. One such validation tool is described below with reference to FIGS. 9 and 10. As illustrated in FIG. 5, the suite setup.sdb file contains ProductA.dll and ProductB.dll in the [complete component list] section, ProductA and ProductB in the [install order] section, etc.

As is now apparent, the components for a suite are listed in the several sections of the setup database file. Since this list is not set to any fixed number or components, the list may change at any time before setup.exe is run. Once setup.exe is run, the file is parsed for the information in the relevant sections. The data in these fields or sections is used without any understanding of the specifics of the suite. This allows the SIT engine/technology to be ignorant of the specifics of the suite, which allows the suite owner/writer maximum flexibility to build, modify, and extend a suite.

Figure 6:
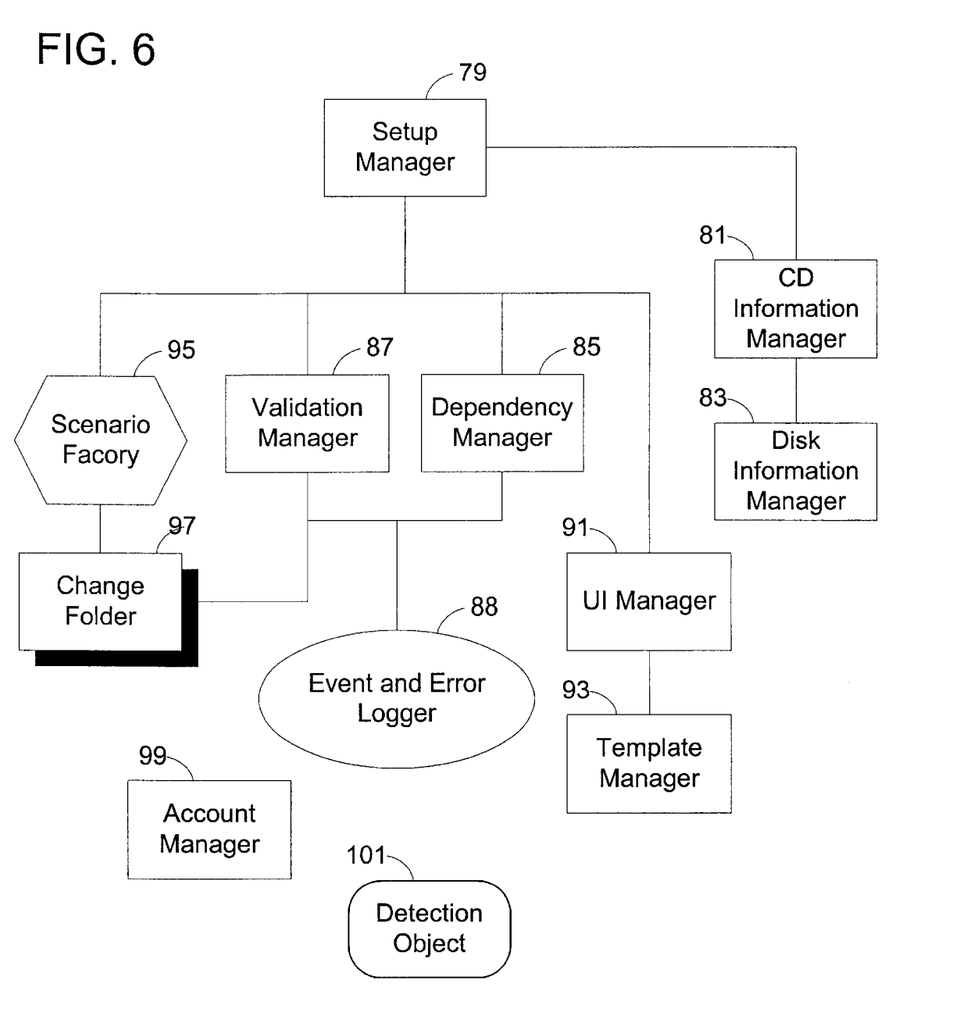
FIG. 6 is a simplified architectural block diagram of an embodiment of the Suite Integration Toolkit of the instant invention.

To gain a better appreciation of the SIT 78 of the instant invention, attention is now directed to the simplified architectural block diagram of FIG. 6. While this FIG. 6 illustrates the SIT 78 as functional blocks or objects, there is no intention to limit the scope of the invention to such blocks or objects, or to any particular technology or programming methodology. Instead, this simplified diagram is presented by way of illustration to aid in the understanding of the logical functionality of an aspect of the instant invention, and is not presented by way of limitation.

The SIT 78 includes a Setup Manager 79 that drives the integration of the setup.sdb files for the suite, as well as the installation process. CD 81 and Disk 83 Information Managers provide required information concerning file location, size, etc. for the suite CD(s) during the integration process, and for the user's system onto which the suite will be installed. During the installation process, the Setup Manager 79 utilizes the services of a Dependency Manager 85 to ensure that the required dependencies of the application programs within a suite are met so that installation may proceed without error, and so that the application programs may run on the user's system once installed. A Validation Manager 87 is also used by the Setup Manager 79 to verify that required system components needed by the suite are met by the user's system for much the same reasons as for the Dependency Manager 85. If an error is determined during either of these checks, it is logged by an Event and Error Logger 89.

During the installation process, the Setup Manager 79 also employs the services of an UI Manager 91 to display the proper information to the user. This UI Manager 91 may utilize a Template Manager 93 if it wants to display standardized pages provided with the SIT 78. The UI Manager 91 may also display any customized pages identified in the setup.sdb file during the installation and setup of the suite. During this installation and setup, the SIT 78 may utilize a Scenario Factory 95 to install only selected application programs or components from the suite as selected by a user or as preconfigured by the suite owner. Specifically, a scenario provides a selected list of components that a user may select, while the scenario factory produces the scenarios. The user is presented with a list of scenarios to select. This is done so that a given 'business problem' may be solved without actually having to select specific applications. Scenarios presented to the user may also be extended. The Change Folder 97 object is then used to select the installation directories of the applications, similar to the 'File Open' dialog.. SIT 78 may also employ an Account Manager 99 if required during the installation and setup process. The SIT 78 also includes a Detection Object 101.

While not specifically illustrated in FIG. 6, SIT 78 may include an intermediate layer (dll) that will enable integration of an application program which relies on a different installation and setup technology (e.g., Install Shield) into the suite. This intermediate layer will wrap the applications installation technology and SIT. During installation and setup, SIT will command the component or application to install, and the dll will launch the application's installation technology.

Once the setup.sdb files are properly combined or merged, the suite is ready for installation and setup. This installation and setup process is seamless from a user's perspective. The SIT determines all of the information requirements for each of the application programs to be installed. SIT then takes the superset of this information and builds the information queries for display to the user to collect the required information. This information is then distributed to each application that requires it, i.e. all applications have access to the collected information. In this way, a given piece of information is collected from a user only one time. If, however, a particular application does not accept that information or otherwise requires different or contrary data for the same piece of information, SIT generates an additional information screen, the information from which will be delivered only to the application that required the different data.

The installation process is actually divided into two primary stages: baseline and install. Baseline may include both a "suite" baseline and a "scenario" baseline, or the scenario baseline can be rolled into the suite baseline if desired. The install stage is divided into pre-install, install, and post-install actions on a component level. The Setup Manager 79 and UI Manager 91, two of the top-level objects of SIT 78, handle integration of the component installations and the UI. The Dependency Manager 85 provides dependency checking and install order calculation and verification across all selected components as mentioned above. Suite owners who want to make use of a predefined set of SIT UI templates can use the Template Manager 93 to load a Wizard 97 page, passing in the required information for that template. Alternately, suite owners who require custom UI can write their own dialogs that are hosted in a Wizard 97 frame (header w/title, description and small graphic and footer with navigation buttons). In both cases, components and/or scenarios handle validation and error reporting for any user input. It should be noted that while the SIT utilizes the Wizard 97 format, the UI is not limited in any way by such format, and may be customized as desired.

A baseline is a requirement determined by the suite owner. It concerns what OS/applications must be on a user's machine before installation of the suite can begin. Suite baseline denotes the actions necessary to get the machine to the required state for the installation of an application or suite. This may include installation of a required operating system (OS), any service packs (SPs), hot fixes, or additional applications necessary for the component or suite to install. Baseline install actions may or may not be visible to the user (i.e. install hot fixes as hidden components). By default, the UI Manager 91 displays start up screens to the user during this stage, including Welcome, Name/Organization, Password, PID, and EULA. All startup screens can be shown/hidden as desired via a [Startup Sequence] section of the setup data file.

Each component must provide information on its (and any sub components) suite baseline requirements. If the suite baseline is not met for a component, any requirements beyond the suite baseline are considered part of the scenario baseline and are displayed to the user on the Scenario Baseline page. If the user chooses not to install the scenario baseline components, Setup Manager 79 prevents the installation of the affected component/sub components. If the setup is unattended (hence the user does not know if the suite baseline has not been met), baseline components are installed silently. If this is not possible (i.e. due to baseline component install restrictions or baseline component is not available), then a message is written out to the error log indicating why the install cannot proceed. If the setup is attended and the Welcome page has been turned off in the setup data file, the Welcome page will still appear if the suite baseline has not been met. If the suite is checking for but not installing baseline components, and the check indicates that the suite baseline has not been met, the user will not be allowed to continue the setup process past the Welcome screen.

Suite baseline components may have dependent components. If these dependent components have not been marked as suite baseline components, SIT sets them as baseline components and tries to install them. If SIT cannot install the dependent components (and hence the suite baseline component), SIT informs the user, logs the error, terminates installation of the component which has a missing dependency, and continues with the rest of the installation. This is similar to the "debug and release" methodology. In this way, the entire suite installation is not adversely affected by one failed component.

As an example of this dependency requirement and the resultant accommodations that SIT makes, consider a suite with Program A, Program B, and Program C included therein. Now assume that Program B is dependent on Program C, i.e. Program B needs Program C for proper operation. SIT will detect this dependency and will install Program C before Program B, even if this requires that the install order in setup.sdb be changed. If, for some reason, Program C cannot be successfully installed, or if Program C is simply not included on the suite CD, SIT will inform the user that a required dependency is missing, skip the installation of Program B, and continue with any other installations remaining for the suite.

A similar problem exists with regard to different versions of the same component required by different application programs. To illustrate, assume Program B requires Component version 1.0, and Program C requires Component version 2.5. Installation of Program C will result in Component version 2.5 being installed on the user's system first (since the dependency requirement between applications must be met as described above). The later installation of Program B would in the past result in the installation of Component 1.0, overwriting Component 2.5. After Program B was installed, prior installation technologies would need to go back and install Component 2.5 for a second time to overwrite the older version that overwrote it. This problem has been overcome with the instant invention. Specifically, SIT utilizes a concept called "shared components" to recognize this situation and install only the latest version of the Component needed by various applications. This greatly reduces the overhead of the installation process as each Component is installed only once.

SIT also supports a scenario baseline. In instances where a user selects a scenario from a Scenario Selection page that has a higher baseline than the entire suite (e.g. when a third-party adds a scenario and does not update the suite baseline), SIT first checks the scenario baseline for the selected scenario. Next, SIT informs the user if scenario baseline has not been met. By default, SIT provides the Scenario Baseline page that displays what components need to be on the user's machine and what components are currently installed, similar to the Welcome page used for communicating suite baseline requirements. In this exemplary UI, the user can click Next to install the scenario baseline components and continue with the installation, click Cancel to exit setup, or click Back to select a different scenario. One skilled in the art will recognize that other UI interfaces may be used to provide this functionality without departing from the scope and spirit of the invention. Finally, SIT installs the scenario baseline components if they are available.

As introduced above, the install stage consists of three phases: pre-install, install, and post-install. Components and sub components can perform setup actions during any/all of these three stages. SIT performs three installation loops during the install stage corresponding to the three stages; all pre-install actions are performed, then all install actions, then all post-install actions. Components with pre-install actions to perform are listed in a [Pre Install Order] section of the setup data file. Components with install actions to perform are listed in a [Install Order] section of the setup data file, and components with post-install actions to perform as listed in a [Post Install Order] section of the setup data file. During the install stage the UI Manager displays the Installation Progress page. During each of the three install stages, the description text in the Installation Progress page is updated to reflect which stage of install is occurring.

During pre-install the Setup Manager loops through all components/sub components that have pre-install actions and tells them to perform the actions. The order of pre-install actions is either (a) the order as defined in the [Pre Install Order] section of the setup data file, or (b) the order required by inter-dependencies between the components. The actual install order is used in all communication with the user (i.e. Installation Progress, Confirmation or Installation Errors screens).

Likewise, during install the Setup Manager sends install message to all components/sub components. The order of install actions is either (a) the order as defined in the [Install Order] section of the setup data file, or (b) the order required by inter-dependencies between the components. In the latter case, the actual install order may differ from the specified display order. As with the pre-install, the actual install order is used in all communication with the user (i.e. Installation Progress, Confirmation or Installation Errors screens).

As may be expected, during post-install the Setup Manager loops through all components/sub components that have post-install actions and tells them to perform the actions (e.g. post-install wizards or utilities). The order of post-install actions is either (a) the order as defined in the [Post-Install Order] section of the setup data file, or (b) the order required by inter-dependencies between the components. In the latter case, the actual install order differs from the specified display order. The actual install order is used in all communication with the user (i.e. Installation Progress, Confirmation or Installation Errors screens).

Post-installation actions (post-final reboot) can be specified in a [Finish Screens] section of the setup data file. Any actions to occur post-reboot should appear after the Finish screen. If the finish screen is not enabled, then post-reboot actions appear as the final item(s) in the [Finish Screens] section. The methods for specifying post-reboot actions are similar to those used in the [Startup Screens] section.

Figure 7:
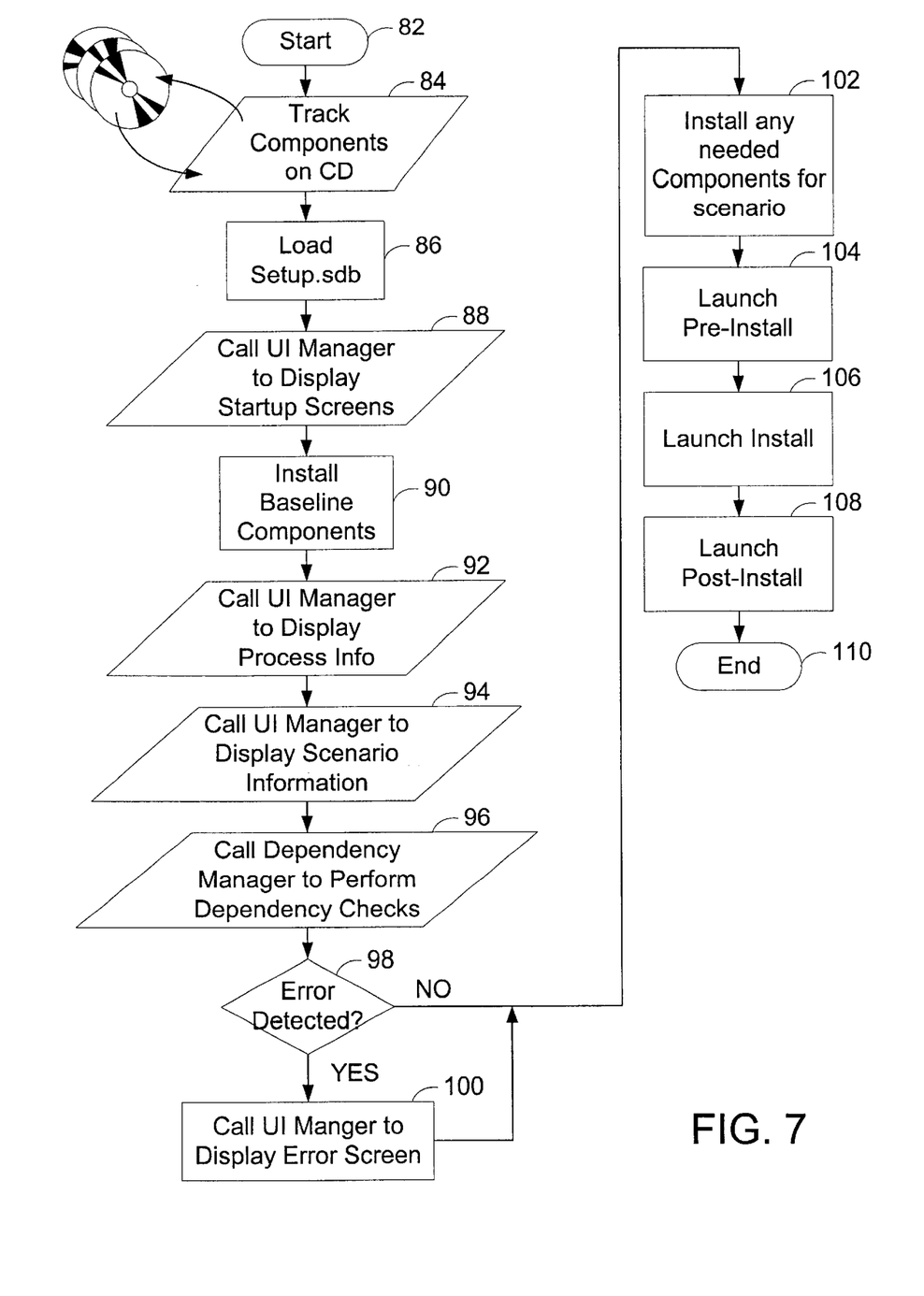
FIG. 7 is a simplified process flow diagram illustrating the setup management in accordance with a method of the instant invention.

With this basic understanding of installation process now in hand, attention is now directed to FIG. 7 for a more detailed explanation of the integration and installation process driven by the Setup Manager 79 of SIT. Once the Setup Manager has been initiated 82, it then tracks where the component bits are located on the suite CDs (the CD layout) 84. It then loads 86 the setup data file (setup.sdb) that contains general installation information, including scenarios, display order of components, list of startup and finish screens, etc. The UI Manager of SIT is then called 88 to display the suite installation startup screens from which the UI Manager gathers and validates user input. The Setup Manager then installs 90 required baseline components, and calls 92 the UI Manager to display progress information during baseline install (preferably, progress will be displayed during silent baseline as well). The UI Manager is then called 94 to retrieve and display scenario information from components and/or from the [Scenarios] section in data file as discussed above.

Then, the Dependency Manager is called 96 to perform dependency checking among the components that user has selected. This dependency checking will be described more fully below. If any conflicts are detected 98, the UI Manager is called 100 to display a Dependency UI screen. The dependency UI will display what the perceived conflicts are and will allow the user to cancel the request which caused the problem, or to have SIT automatically set the Actions of the required components to a state which resolves the issue. Scenario data files provide a simple hook into setup for third-party users of the Setup Manager. The Setup Manager also installs 102, when necessary, components needed to achieve the scenario baseline if it differs from the suite baseline. This may occur, e.g., when a third party modifies a scenario data file, but neglects to modify the setup data file. As a result, the scenario baseline is no longer a subset of the suite baseline and requires the installation of additional components. The Setup Manager also launches pre-install 104, install 106, and post-install 108 loops and sends messages to components/sub components to perform actions during these installation stages before the process terminates 110.

Third-party calls into this setup process are also supported in the system of the instant invention. If desired, these third parties can hook in as the setup data file is loaded. As an example, the data file shipped with a suite can be modified and shipped on a third party supplied CD that is loaded first in the installation process. In this case, the Setup Manager will load the updated data file containing third-party product information as part of the startup. Alternatively, third parties can hook in after the suite baseline has been achieved by replacing/rewriting the scenario data file.

Figure 8A:
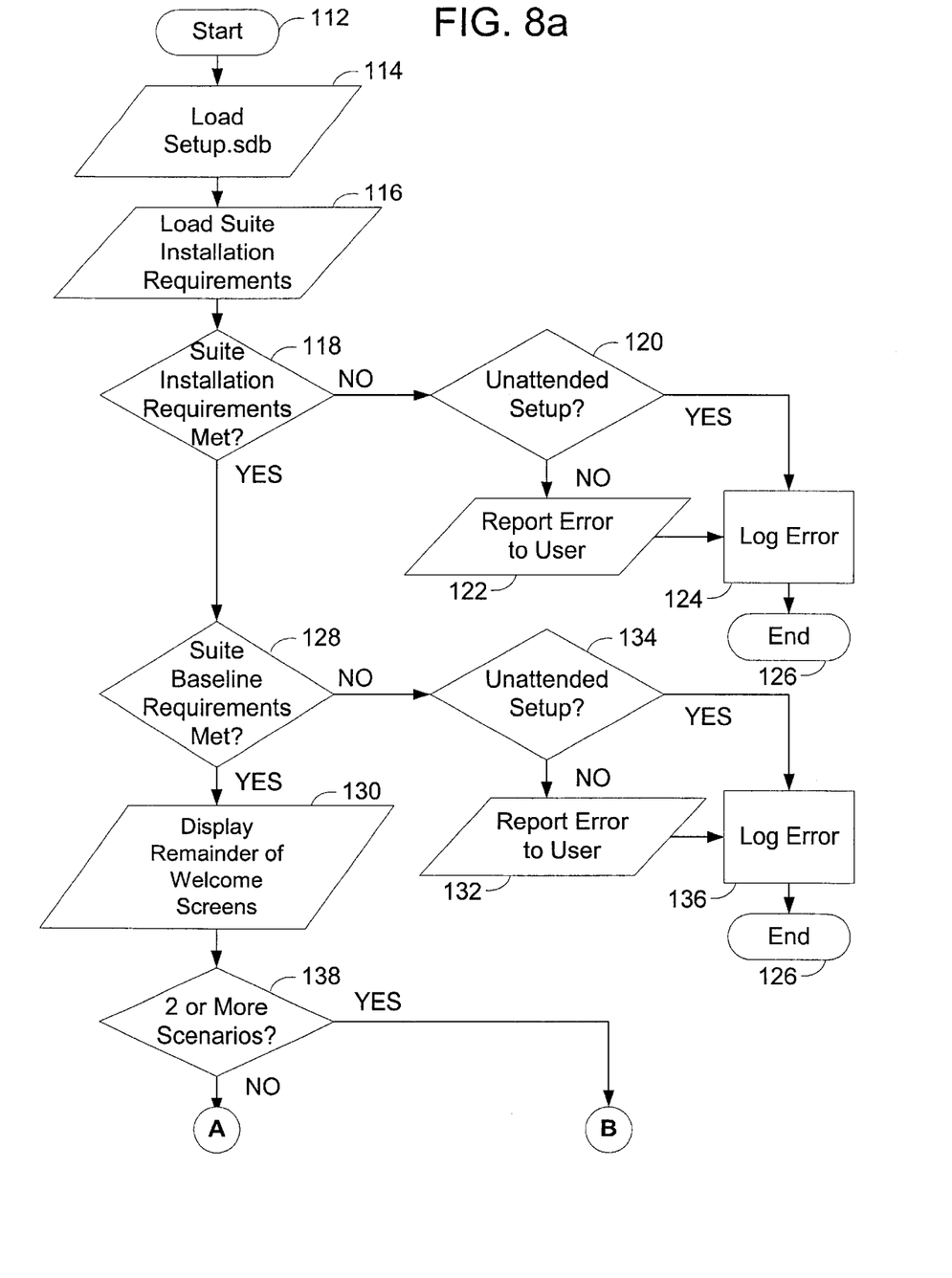

Turning now to FIG. 8, the basic flow of a suite setup is illustrated in greater detail. Once started 112, the setup.sdb file is loaded 114 as discussed above. If the setup data file is missing or cannot be loaded, a message box appears and informs the user of the problem. The suite installation requirements dynamic load libraries (dll) are then loaded 116 if specified, and a check is made 118 to determine if suite requirements have been met (i.e. RAM, processor, platform, pagefile, etc.). Insufficient suite requirements are reported to the user 122 via the Welcome screen, or an error is logged 124 and setup terminates 126 in the unattended case 120.

A check that the system meets the minimum requirements for the suite baseline is then performed 128. If the minimum requirements are not met, this is reported to the user 132. If the setup is unattended 134, the error is logged 136 and setup is terminated 126.

Setting the custom property of all required suite baseline components can specify the suite baseline. This method is used when SIT is installing baseline components. The suite baseline can also be specified in the setup data file as indicated above. In such a case, SIT handles detection of the baseline, and the installation of these baseline components.

Generally, suite baselines include OS, SPs, quick fix engineering or hot fixes (QFEs) (possibly as hidden components), Internet Explorer (IE), etc. The default Welcome page displays information about the user's machine and suite baseline components required, if any. Then the remainders of default startup screens are displayed 130. Preferably, all screens are optional, and may include Name/Organization, Password, PID, End User License Agreement (EULA), AutoLogon, etc. Screens can be shown/hidden by adding/deleting the names of the screens in the [Startup Screens] section of the setup data file. A suite owner or third party can add their own UI at anytime in this sequence, or launch applications and/or processes during this sequence.

Figure 8B:
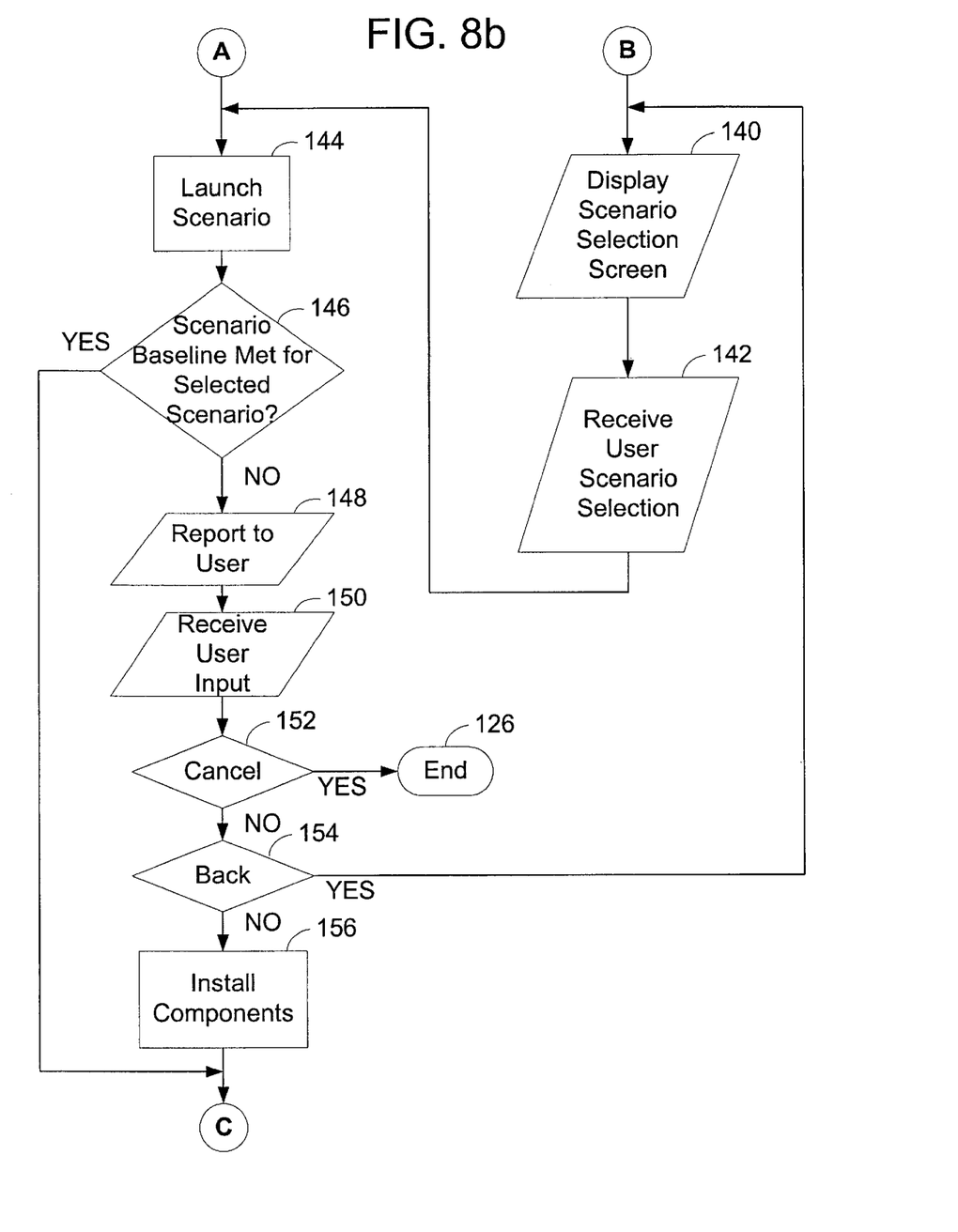

Next, if there are two or more scenarios 138, the scenario selection screen is displayed 140. This occurs once the suite baseline options have been satisfied and the startup screens (if specified), have been displayed. The screen displayed is the initial UI page specified in the scenario data file. On this page, users can choose 142 from a number of different pre-configured setups, or select Custom Scenario to completely customize the component or suite installation. If there is only one valid scenario available, that scenario is launched 144 without first displaying the Scenario Selection page. The scenario baseline based on the selected scenario is then checked 146. The user is informed 148 if the scenario baseline has not been met. By default, SIT provides the Scenario Baseline page that displays what components need to be on the user's machine and what components are currently installed, similar to the Welcome page used for communicating suite baseline requirements. The user can 150 click Next to install 156 the scenario baseline components and continue w/installation, click Cancel 152 to exit setup 126, or click Back 154 to select a different scenario.

The selected scenario may display a component selection page if users are given the option of selecting/deselecting components and sub components. The component selection page presents the user with a tree view containing all of the components and their sub components. From this view the user may select or deselect a component and set its installation directory of any component. Users can also specify the setup action to be performed on each component or sub component (e.g. install, uninstall, add, recovery, no action). Version information and disk space requirements may also be displayed on this page. As users select and deselect the components or modify install actions on a component, full dependency checking is performed.

At this point in the setup, any components with additional UI requirements may present their UI pages 158. The default is to have custom UI pages for components appear in the order in which the components are listed in Component Selection page, although this may be changed as desired. Next, an installation summary is provided 160. All of the options and information the user has selected is displayed for final approval 162. Preferably, the user can navigate back to modify any of his or her selections from this screen.

Figure 8C:
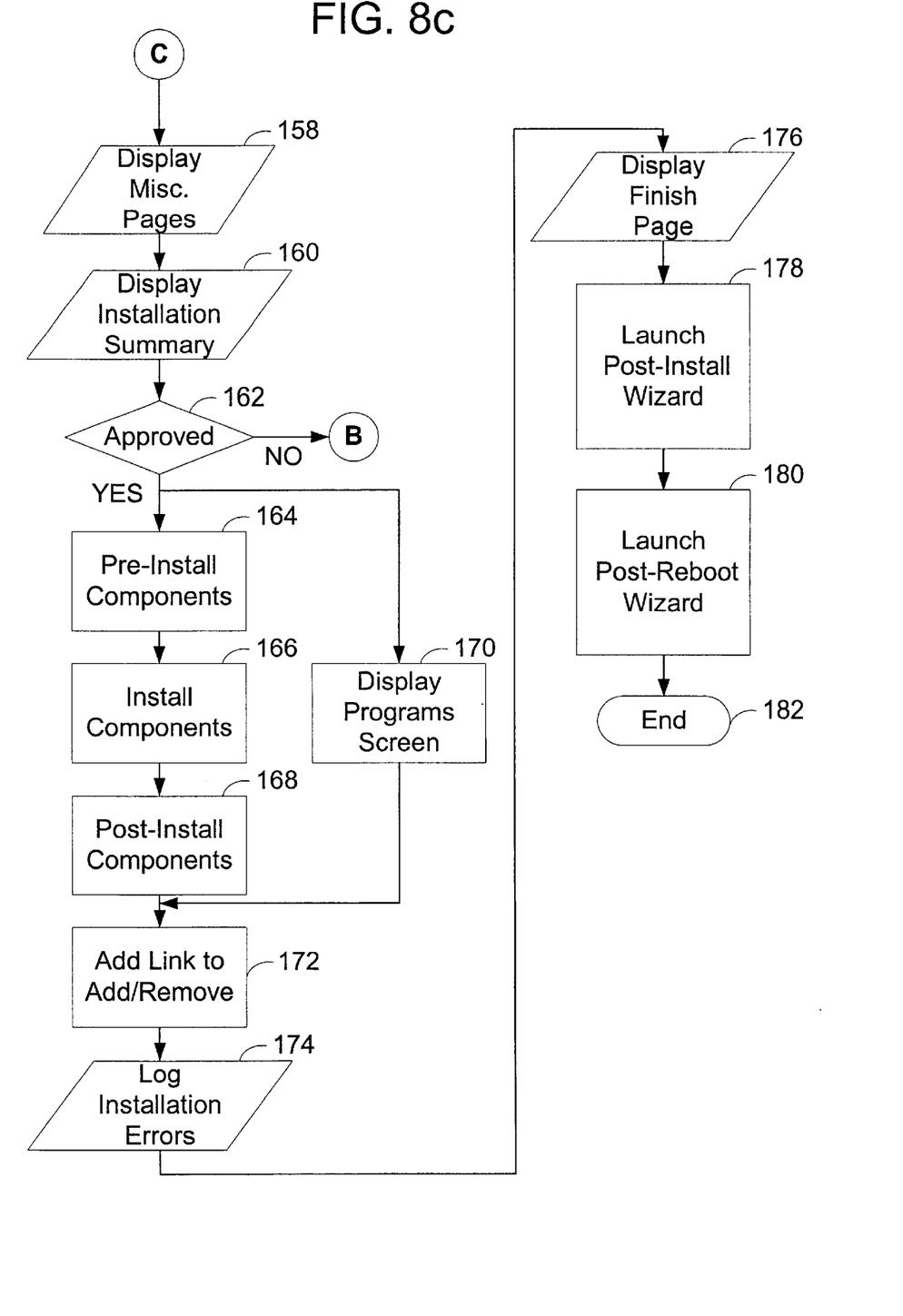

Once the setup has been approved 162, the Setup Manager sends 164 a pre-install message to all components and all sub components as discussed above. The components have the option of prompting the user if they want to perform the pre-install action for a component. The suite owner can also specify pre-install actions by default and suppress user prompt. The Setup Manager then sends 166 an install message to all selected components and sub components. Next, the Setup Manager sends 168 a post-install message to all components and sub components. As with the pre-install, the components have the option of prompting user if they want to perform the post-install action for a component. The suite owner can also specify post-install actions by default and suppress user prompt.

During this process, an installation-progress page is provided 170. As SIT loops through pre-install components, install components, and post-install components as specified in the [Pre Install Order], [Install Order], and [Post Install Order] sections of the setup data file, the description text in the header of the progress screen updates with each change in install stage. This provides an indication of where in the process SIT is. SIT also adds a link 172 in the Add/Remove section of Control Panel. The name of the link corresponds to the suite name as specified in the [Product Information] section of the setup data file. Further, any installation errors encountered during the course of installation are logged 174 to a file specified in the [Error Log] section of the setup data file. A finish page is then displayed 176, and SIT writes out an unattend file for the completed setup.

Each component can launch 178 post-installation wizards or scripts. The suite can also specify a suite-wide wizard or script to be run, which can also be driven via the scenario. Each component may also specify an executable to run post-reboot 180. This can also be driven via the scenario. After these actions have been taken, as desired, the process is complete 182.

Figure 9:
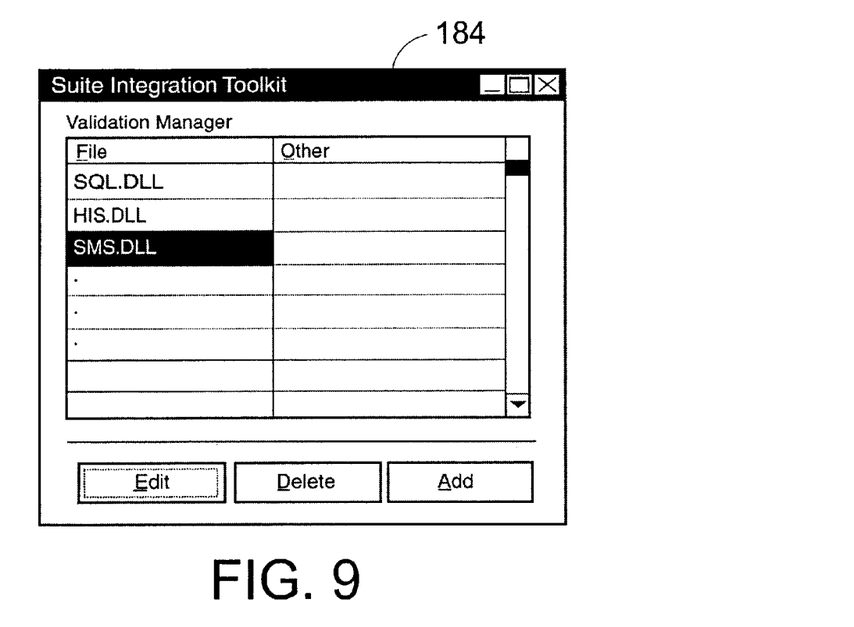
FIG. 9 is a simplified graphical illustration of a validation tool user interface in accordance with an aspect of the instant invention.
Figure 10:
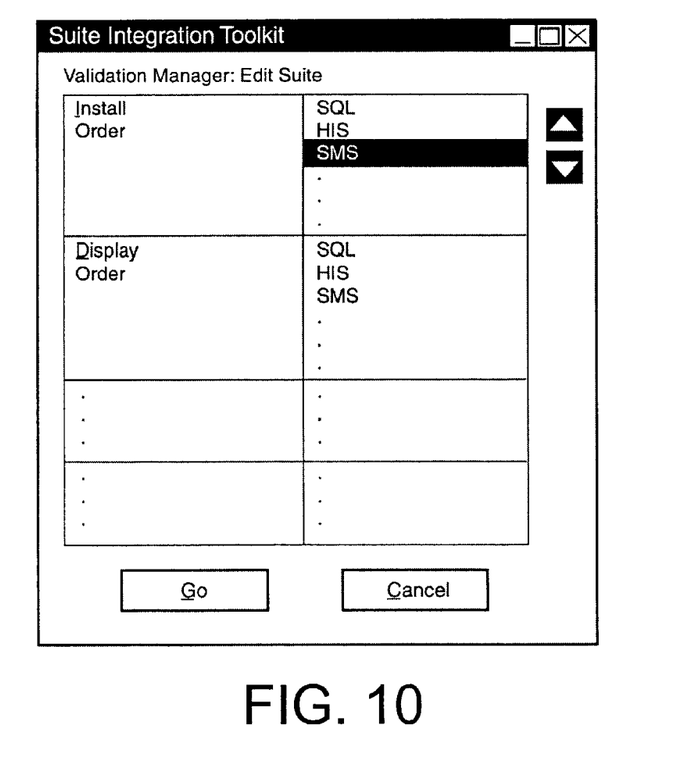
FIG. 10 is a simplified graphical illustration of an additional user interface of the validation tool of FIG. 9.

As introduced above, the setup.sdb file (see FIG. 5) may additionally be edited using a simple text editor or a validation tool. One such validation tool for setup.sdb file manipulation by a suite owner is illustrated in FIG. 9. As may be seen from this simplified screen display, the validation manager 184 lists all of the application programs included in the suite. This tool provides the ability for a suite owner to edit the suite make up, add an application program, or delete an application program in a graphical manner. By using this tool 184, a suite owner would simply highlight an application and click on Delete to remove that application from the suite. The tool would remove all instances of that application throughout the setup.sdb file automatically. Likewise, by clicking on the Add button, the suite owner is able to add a new application to a suite by pointing to its CD or files. The tool 184 would automatically perform the merging of all of the required information into the setup.sdb file through SIT.

If the suite owner wished to edit any information in the setup. sdb file, the owner would simply click on the edit button. This would result in the display of the screen illustrated in FIG. 10. In this screen, the sections of the setup.sdb file are displayed with the corresponding information contained therein. To edit this information, the suite owner simply needs to highlight the required information. For example, if the suite owner wished to change the install order, the owner would highlight the required file, and use the advance or retard button to increase or decrease its order within that section. Once the suite owner finished with the edits, the owner simply clicks on the Go button to generate the new setup.sdb file.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable medium having stored thereon an application program suite setup database file having a data structure, comprising:
   a first data field containing data representing a complete component list of all applications included in an application program suite;
   a second data field containing data representing an install order of all of the applications included in the application program suite; and
   a third data field containing data representing a component display of all of the applications included in the application program suite.

2. A computer-readable medium having stored thereon an application program suite, comprising:
   a first application program;
   a second application program; and
   a suite setup database file, the suite setup database file having a data structure comprising
      a first data field containing data representing a complete component list of all applications included in an application program suite;

a second data field containing data representing an install order of all of the applications included in the application program suite; and a third data field containing data representing a component display of all of the applications included in the application program suite.

3. A method of extending an existing application program suite with an additional application, comprising the steps of:

providing an existing application program suite, the existing application program suite including a suite setup database file for the existing application program suite, the suite setup database file constructed in accordance with a standard format having a data structure including a first data field containing data representing a complete component list of all applications included in the application program suite, a second data field containing data representing an install order of all of the applications included in the application program suite, and a third data field containing data representing a component display of all of the applications included in the application program suite;

providing an additional application program, the additional application program including an application setup database file for the additional application, the application setup database file constructed in accordance with the standard format;

combining the suite setup database file with the application setup database file to form an extended suite setup database file, the extended suite setup database file conforming to the standard format; and including the additional application program with the existing application program suite to form an extended application program suite including the extended suite setup database file.

4. The method of claim 1, further including the step of replacing the application setup database file and the existing suite setup database file with the extended suite setup database file.

5. The method of claim 1, wherein the step of providing an additional application program including an application setup database file comprises the step of segregating information required for application program installation and setup into a plurality of standard sections to form the application setup database file.

6. The method of claim 5, wherein the step of providing an existing application program suite including a suite setup database file comprises the step of segregating information required for suite program installation and setup into a plurality of standard sections to form the suite setup database file.

7. The method of claim 6, wherein the step of combining the suite setup database file with the application setup database file to form the extended suite setup database file conforming to the standard format comprises the step of copying information from each of the plurality of standard sections of the application setup database file into corresponding standard sections of the suite setup database file.

8. The method of claim 6, wherein the step of combining the suite setup database file with the application setup database file to form the extended suite setup database file conforming to the standard format comprises the steps of:

creating the extended suite setup database file in accordance with the standard format having a plurality of standard sections therein;

copying information from each of the plurality of standard sections of the suite setup database file into corresponding standard sections of the extended suite setup database file; and copying information from each of the plurality of standard sections of the application setup database file into corresponding standard sections of the extended suite setup database file.

9. The method of claim 1, wherein the step of combining the suite setup database file with the application setup database file to form the extended suite setup database file conforming to the standard format is performed by using a text editor.

10. The method of claim 1, wherein the step of combining the suite setup database file with the application setup database file to form the extended suite setup database file conforming to the standard format is performed automatically by an automated tool.

11. A method of forming an application program suite, comprising the steps of:

providing a first application program, the first application program including a first setup database file for the first application program, the first setup database file constructed in accordance with a standard format having a data structure including a first data field containing data representing a complete component list of all applications included in the application program, a second data field containing data representing an install order of all of the applications included in the application program, and a third data field containing data representing a component display of all of the applications included in the application program;

providing a second application program, the second application program including a second setup database file for the second application, the second setup database file constructed in accordance with the standard format;

combining the first setup database file with the second setup database file to form a suite setup database file, the suite setup database file conforming to the standard format; and including the first application program with the second application program suite to form an application program suite including the suite setup database file.

12. The method of claim 11, further including the step of replacing the first setup database file and the second setup database file with the suite setup database file.

13. The method of claim 11, wherein the step of providing the first application program including the first setup database file comprises the step of segregating information required for the first application program installation and setup into a plurality of standard sections to form the first setup database file.

14. The method of claim 13, wherein the step of providing the second application program including the second setup database file comprises the step of segregating information required for the second program installation and setup into a plurality of standard sections to form the second setup database file.

15. The method of claim 14, wherein the step of combining the first setup database file with the second setup database file to form the suite setup database file conforming to the standard format comprises the step of copying information from each of the plurality of standard sections of the first setup database file into corresponding standard sections of the second setup database file.

16. The method of claim 14, wherein the step of combining the first setup database file with the second setup database file to form the suite setup database file conforming to the standard format comprises the steps of:

creating the suite setup database file in accordance with the standard format having a plurality of standard sections therein;

copying information from each of the plurality of standard sections of the first setup database file into corresponding standard sections of the suite setup database file; and copying information from each of the plurality of standard sections of the second setup database file into corresponding standard sections of the suite setup database file.

17. The method of claim 11, wherein the step of combining the first setup database file with the second setup database file to form the suite setup database file conforming to the standard format is performed by using a text editor.

18. The method of claim 11, wherein the step of combining the first setup database file with the second setup database file to form the suite setup database file conforming to the standard format is performed automatically by an automated tool.

* * * * *